(12) United States Patent
Green et al.

(10) Patent No.: US 7,248,039 B2
(45) Date of Patent: Jul. 24, 2007

(54) DISK PACK SWAP PROCESS FOR EVALUATING MAGNETIC RECORDING PERFORMANCE

(75) Inventors: Paul M. Green, Hollister, CA (US); Peter Ivett, Morgan Hill, CA (US); Wyman Pang, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 282 days.

(21) Appl. No.: 10/928,085

(22) Filed: Aug. 27, 2004

(65) Prior Publication Data

US 2006/0043967 A1    Mar. 2, 2006

(51) Int. Cl.
G01R 33/12    (2006.01)
G11B 5/02    (2006.01)

(52) U.S. Cl. .................. 324/210; 324/212; 360/25
(58) Field of Classification Search .......... 324/210, 324/212, 260, 261; 360/25, 31
See application file for complete search history.

(56) References Cited

U.S. PATENT DOCUMENTS

| | | |
|---|---|---|
| 3,555,286 A | 1/1971 | Cote |
| 3,761,905 A | 9/1973 | Hollstein et al. |
| 3,781,835 A | 12/1973 | Dion et al. |
| 3,843,967 A | 10/1974 | Mulvany |
| 4,412,261 A | 10/1983 | Tateyama et al. |
| 4,847,558 A | 7/1989 | Fisher et al. |
| 5,212,445 A | 5/1993 | Meyer |
| 5,826,325 A | 10/1998 | Price et al. |
| 5,952,563 A * | 9/1999 | Shiraki .................. 73/105 |
| 6,064,535 A * | 5/2000 | Wilson et al. ............. 360/60 |
| 6,225,799 B1 | 5/2001 | Gergel et al. |
| 6,229,303 B1 | 5/2001 | Guzik |
| 6,275,029 B1 * | 8/2001 | Schaff .................. 324/212 |
| 7,009,391 B2 * | 3/2006 | Lee et al. ............... 324/212 |

FOREIGN PATENT DOCUMENTS

| | | |
|---|---|---|
| JP | 2073177 | 3/1990 |
| JP | 3252552 | 11/1991 |
| JP | 11016102 | 1/1999 |

OTHER PUBLICATIONS

"Disk Surface Analysis Technique" IBM Technical Disclosure Bulletin. Feb. 1976; pp. 3032.
C. J Taylor "Disk Pack Testing—A New Approach" Proc. Conf. Video & Data Recording Jul. 10-12, 1973; pp. 189ff.

* cited by examiner

Primary Examiner—Edward Lefkowitz
Assistant Examiner—Kenneth J. Whittington

(57) ABSTRACT

A method for testing electromagnetic characteristics of magnetic media while maintaining consistent performance of a read/write head and recording channel is disclosed. The disclosed method is performed such that reduced statistical sampling is achieved. The method includes recording a first set of baseline measurements utilizing a first magnetic media with the read/write head and recording channel. The first magnetic media is then removed from an assembly containing the read/write head and recording channel and is replaced with a second magnetic media. Measurements are made utilizing the second magnetic media with the read/write head and recording channel, wherein the measurements are comparable with the baseline measurements and wherein consistent performance of the read/write head and the recording channel is maintained so as to reduce the size of statistical samples needed.

22 Claims, 5 Drawing Sheets

300

Begin

↓

Record a first set of baseline measurements with a first magnetic media utilizing a read/write head and recording channel.
310

↓

Remove the first magnetic media from an assembly comprising the read/write head and recording channel and replace it with a second magnetic media.
320

↓

Collect measurements from the second magnetic media utilizing the (same) read/write head and recording channel.
330

| Drive S/N | Head Type | Disk Type | Soft Error Rate | Overwrite | Magnetic Core Width | Notes |
|---|---|---|---|---|---|---|
| 48A1 | ZZ | AA (Ref.#1) | -5.5 | 25.3 | 92 | 1. Baseline disk AA |
| | | BB (Ref.#2) | -5.7 | 26.0 | 91 | 2. New disk design BB |
| | | CC (Ref.#2) | -5.8 | 26.1 | 90 | 3. New disk design CC |
| | | DD (Ref.#2) | -6.0 | 27.0 | 92 | 4. New disk design DD |
| | | AA (Ref.#1) | -5.6 | 24.9 | 91 | 5. Repeat baseline AA |
| | | EE (Ref.#2) | -5.6 | 23.7 | 89 | 6. New disk design EE |
| | | FF (Ref.#2) | -6.1 | 26.5 | 90 | 7. New disk design FF |
| | | DD (Ref.#2) | -5.9 | 25.1 | 92 | 8. Repeat disk DD |

FIG. 5

DISK PACK SWAP PROCESS FOR EVALUATING MAGNETIC RECORDING PERFORMANCE

RELATED ART

The present invention relates to a method for testing the magnetic recording performance of magnetic disk media. In a magnetic storage system, such as a computer disk drive, digital information is magnetically stored upon the surface of a magnetic disk. The digital information is represented by selectively polarizing the magnetic field of consecutive areas across the surface of the rotating magnetic disk. When this information is read back from the disk, the magnetic polarization of the medium is sensed and converted into an electrical output signal.

This reading and writing operation is through a magnetic read/write head which is suspended over the surface of the rotating disk and which provides a raw data signal. The raw data signal is representative of relative strength of the magnetic flux density present on the magnetic disk. It is highly desirable to provide the highest level of information storage density possible for a given magnetic storage system. Increased storage density can lead to significant noise levels in the raw data signal.

In an ongoing effort to reduce noise level and improve the storage density on magnetic disks, manufacturers of magnetic disks are researching new materials and methods for fabricating the disks. As new designs are developed, it is necessary to test them for their electromagnetic properties, such as soft error rate (SER) and overwrite, to determine if improvements are occurring.

One conventional approach to testing magnetic media is the use of a spin stand. In the spin stand the electromagnetic characteristics of disk designs are tested at the development facility without being inserted into HDAs. Although this provides for fast turn-around of the evaluation process, the characteristics that are measured in a spin stand are frequently found not to be repeatable when placed in a head disk assembly (HDA), and thus the disk performance is not what was anticipated. Therefore, it is desirable to evaluate the disk performance in the environment in which it will ultimately reside.

Another conventional approach is to perform the tests with completed HDAs in which the magnetic disks will ultimately reside, each having individual read/write heads and recording channels. Because each read/write head has its own (high level) noise characteristics, in order to differentiate a problem that is attributable to the electromagnetic characteristics of a magnetic disk, a large sample (e.g., 500 to 1000) of HDAs must be fabricated and the magnetic disks must be installed and tested. In other words, there are two variables for each tested sample; the disk characteristics and the read/write head characteristics. Therefore, it is necessary to have a large population of samples to achieve adequate statistics for discerning an SER, for example.

Typically, the newly designed disks are fabricated on-site at the manufacturer's research and development facility. However, the HDAs are typically manufactured at offshore facilities. Thus, there is a long lead-time for shipping, assembling and testing the new designs prior to being able to evaluate them. This process of building a large number of HDAs is very labor intensive. It results in increased turn-around time for getting new designs into production, carries a large cost burden in both materials and man-hours, and results in decreased throughput. Not only is it problematic that it takes so long to get the statistical sampling and results needed, but in today's technology the product cycles are continually shrinking which makes the large turn-around time for testing even more egregious.

SUMMARY

A method for testing electromagnetic characteristics of magnetic media while maintaining consistent performance of a read/write head and recording channel is disclosed. The disclosed method is performed such that reduced statistical sampling is achieved. The method includes recording a first set of baseline measurements utilizing a first magnetic media with the read/write head and recording channel. The first magnetic media is then removed from an assembly containing the read/write head and recording channel and is replaced with a second magnetic media. Measurements are made utilizing the second magnetic media with the read/write head and recording channel, wherein the measurements are comparable with the baseline measurements and wherein consistent performance of the read/write head and the recording channel is maintained so as to reduce the size of statistical samples needed.

BRIEF DESCRIPTION OF THE DRAWINGS

FIG. 3 is a flow diagram of a method for testing electromagnetic characteristics of magnetic media while maintaining consistent performance of a read/write head and recording channel, in accordance with one embodiment of the present invention.

FIG. 5 is an illustration of typical results from a series of tests for electromagnetic characteristics of a plurality of magnetic disks, in accordance with one embodiment of the present invention.

DETAILED DESCRIPTION

Reference will now be made in detail to embodiments of the invention, examples of which are illustrated in the accompanying drawings. While the invention will be described in conjunction with the embodiments, it will be understood that they are not intended to limit the invention to these embodiments. Furthermore, in the following detailed description, numerous specific details are set forth in order to provide a thorough understanding of the present invention. In other instances, well known methods, procedures, and components have not been described in detail so as not to unnecessarily obscure aspects of the present invention.

Embodiments of the present invention include a method for testing electromagnetic characteristics of magnetic media, e.g., magnetic disks, while maintaining consistent performance of a read/write head and recording channel, such that reduced statistical sampling is achieved. The main purpose of the present invention is to reduce the turn-around time and costs and to improve the repeatability of the testing process. This is achieved by utilizing a single head drive assembly (HDA) and swapping disks into and out of the assembly for purposes of performing the tests. By utilizing a single HDA, having a single set of read/write heads and recording channels, a smaller statistical sample is required in order to determine the electromagnetic characteristics of the disk or disks being tested, as the noise associated with the read/write heads and recording channels is consistent from sample to sample, so it is easy to differentiate the noise and characteristics attributable to the magnetic disk.

In addition, by placing the disk or disks in the HDA assembly, the characteristics are being measured in the environment in which they will ultimately reside, and are therefore consistent with a final product. In other words, unlike when testing is performed on a spin stand, the performance when assembled as a final product is what was expected based on the testing.

Figure 4:
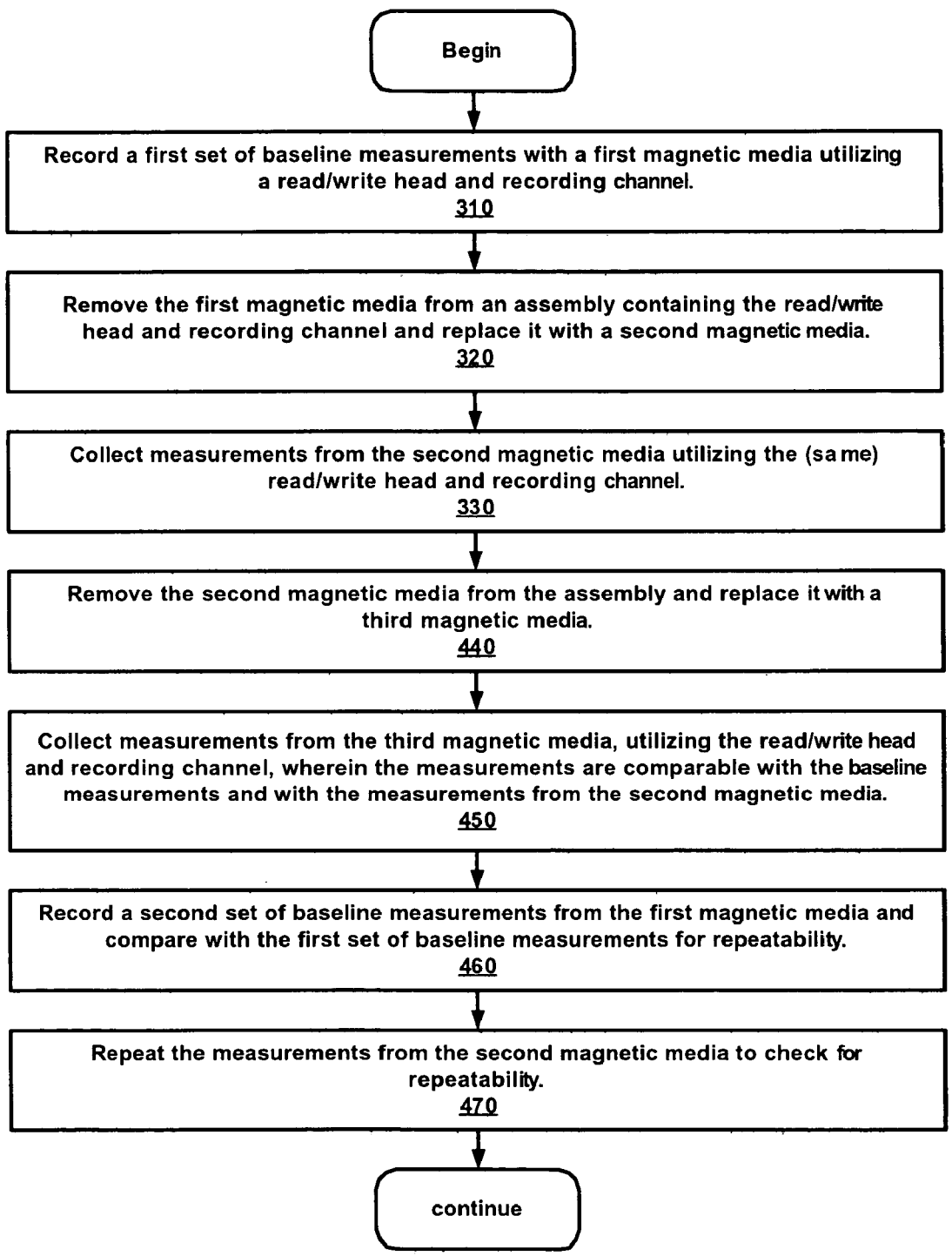
FIG. 4 is a flow diagram of a method for testing electromagnetic characteristics of magnetic media while maintaining consistent performance of a read/write head and recording channel, in accordance with another embodiment of the present invention.

Certain portions of the detailed descriptions of embodiments of the invention, which follow, are presented in terms of processes and methods (e.g., Method 400 of FIG. 4). Although specific steps are disclosed herein describing the operations of these processes and methods, such steps are exemplary. That is, embodiments of the present invention are well suited to performing various other steps or variations of the steps recited in the processes and methods herein.

Figure 1:
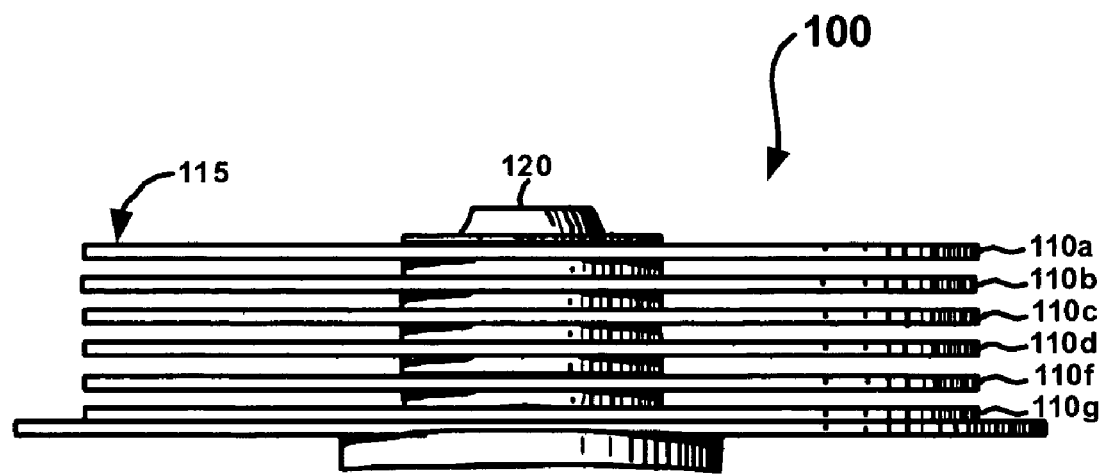
FIG. 1 is a partial side elevation view of a stack of magnetic disks, in accordance with one embodiment of the present invention.

FIG. 1 is a partial side elevation view of a stack of magnetic disks, or disk pack 100, in accordance with one embodiment of the present invention. Disk pack 100 is shown to be residing on a spindle 120. During the testing process, as described in FIGS. 4 and 5 below, the disk pack 100 may be removed from spindle 120 and placed in an HDA (e.g., HDA 200 of FIG. 2) for the purposes of testing the disks in the disk pack. According to one embodiment, the disk pack may contain a number of magnetic disks, typically four, five or six. As illustrated in the present embodiment, a disk pack may contain six disks, 110a, 110b, 110c, 110d, 110f and 110g. In a magnetic storage system, such as a computer disk drive, digital information is magnetically stored upon the surface 115 of magnetic disk 110a.

In another embodiment, a single magnetic disk (e.g. disk 110a), or a series of single magnetic disks may be tested in an assembly designed for a single magnetic disk, having a single read/write head and recording channel.

Figure 2:
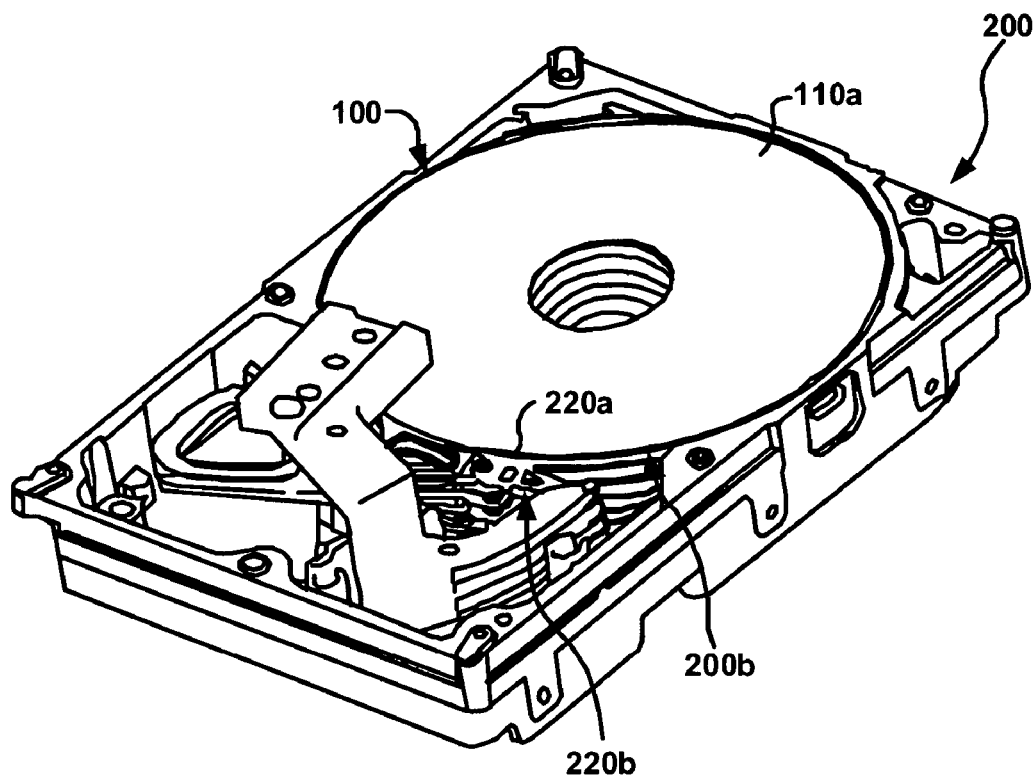
FIG. 2 is an isometric view of a typical head disk assembly, in accordance with one embodiment of the present invention.

FIG. 2 is an isometric view of an HDA 200, in accordance with one embodiment of the present invention. HDA 200 is shown with disk pack 100 loaded. It can be seen that there is a read/write head 220a for magnetic disk 110a and a read/write head 220b for magnetic disk 110b. HDA 200 has a read/write head for each magnetic disk in disk pack 100. Each read/write head, e.g. 220a is coupled to a recording channel. In other embodiments, HDA 200 may accommodate any number of magnetic disks, including a single disk.

FIG. 3 is a flow diagram of a method 300 for testing electromagnetic characteristics of magnetic media while maintaining consistent performance of a read/write head and recording channel, in accordance with one embodiment of the present invention. In an ongoing effort to reduce noise level and improve the storage density on magnetic disks, manufacturers of magnetic disks are researching new materials and methods for fabricating the disks. As new designs are developed, it is necessary to test them for their electromagnetic properties, such as soft error rate (SER) and overwrite, to determine if improvements are occurring.

At step 310 of method 300, a first set of baseline measurements is recorded from a first magnetic media utilizing a read/write head and a recording channel in accordance with one embodiment of the present invention. The first magnetic media may be a single magnetic disk or a plurality of magnetic disks, such as shown in disk pack 100 of FIG. 1. The read/write head and recording channel corresponds one-to-one with the number of magnetic disks for which measurements are being recorded. The set of measurements relates to the electromagnetic characteristics of the surface of the magnetic media. These characteristics may be, for example, soft error rate (SER), overwrite and magnetic core width.

At step 320 of FIG. 3, in accordance with one embodiment, the first magnetic media is removed from an assembly comprising the read/write head and recording channel and is replaced with a second magnetic media. This might be considered a "swap-out method wherein one magnetic media is removed from the assembly and another one is inserted into the same assembly. The assembly may be an HDA or hard disk drive (HDD). The second magnetic media may be a single magnetic disk or a number of magnetic disks, for instance a disk pack. The second magnetic media may have a different composition of layers deposited on its surface (e.g., surface 115 of FIG. 1) than that of the first magnetic media.

At step 330 of FIG. 3, according to one embodiment, measurements are collected from the second magnetic media utilizing the same read/write head(s) and recording channel(s) as were utilized for the baseline measurements that were performed with the first magnetic media. By utilizing the same read/write head and the same recording channel for the successive tests, any noise associated with the read/write head, for example, may be readily determined and the electromagnetic characteristics of the magnetic media can be discerned. That is, in the present embodiment, by utilizing the same read/write head, the noise associated with the head is fairly constant from test to test and, thus, the noise cancels out in successive tests so that the electromagnetic characteristics of the magnetic media become readily discernable.

Therefore, method 300 of FIG. 3 provides for a process of testing various designs of magnetic media without requiring a large number of assemblies to be built in order to provide an adequate statistical sampling since the various designs are tested in an assembly with known characteristics. Thus, the present embodiment, wherein the measurements are collected utilizing a known HDA, lends itself readily to being performed on-site at the manufacturer's research and development facility. This eliminates the long turn-around time and high costs associated with the conventional approach of large quantity drive assembly fabrication, frequently performed off-shore.

FIG. 4 is a flow diagram of a method 400 for testing electromagnetic characteristics of magnetic media while maintaining consistent performance of a read/write head and recording channel, in accordance with another embodiment of the present invention. Steps 310, 320 and 330 have been described in the discussion of FIG. 3 above.

At step 440, the second magnetic media may be removed from the assembly and replaced from a third magnetic media, according to one embodiment of the present invention. The third magnetic media may be a single magnetic disk or a number of magnetic disks, for instance a disk pack. The third magnetic media may have a different composition of layers deposited on its surface (e.g., surface 115 of FIG. 1) than that of the second magnetic media.

At step 450 of method 400, according to one embodiment, measurements are collected from the third magnetic media, utilizing the same read/write head and recording channel as in steps 310 and 330, wherein the measurements are comparable with the baseline measurements and with the measurements collected with the second magnetic media. This can provide rapid feedback to designers regarding the relative merits of various designs, thereby affording them the ability to better stay ahead of the continually shrinking product cycles.

At step 460 of method 400, a second set of baseline measurements may be collected from the first magnetic media and compared with the first set of baseline measurements to check for repeatability of the measurements, according to one embodiment. This can provide an indication of the accuracy of the measurements of the electromagnetic characteristics of the first magnetic media.

In one embodiment of the present invention, as stated in step 470 of method 400, the measurements are repeated with the second magnetic media to check for repeatability. This step may be performed at various points during a test run with several designs of magnetic media, which may be the testing of either a single magnetic disk of a given design or several disks, e.g., a disk pack, of disks of a given design. This checks for consistency in measurements from one test run to another for a given design, and is facilitated by the ability to swap the magnetic disk(s) in and out of the assembly, and the ability to do so at the manufacturer's research and design facility.

FIG. 5 is an illustration of typical results 500 of a series of tests for electromagnetic characteristics of a plurality of magnetic disks, in accordance with one embodiment of the present invention. It should be understood that results 500 are only exemplary, and that any characteristics other than and/or including the ones presented in results 500 may be measured. The results may be presented in tabular form, as shown. Column 510, according to the present embodiment, indicates the disk drive assembly (48A1), or HDA, being utilized for the series of tests, by serial number. Column 520 identifies the type of read/write head being used. The magnetic disks that are being tested are identified, in chronological sequence, in column 530.

Results of testing each of the disks listed in column 530 are shown, according to the present embodiment, in columns 540, 550 and 560. Notes regarding the nature of each test are shown to be listed in column 565. According to the present embodiment, a baseline test is performed on disk AA (a first magnetic media), the results of which are shown in row 570. Then disk AA is swapped out of the drive (48A1) and a new disk design BB (a second magnetic media) is inserted and the same measurements are taken and recorded, as shown in row 575. At row 580, according to the present embodiment, disk design BB is replaced by disk CC (a third magnetic media) and the measurements are recorded. Another disk design, disk design DD, replaces disk design CC, and measurements are taken, the results of which are recorded in row 585. This process may be repeated for various designs, and the results may be compared for design optimization.

In row 590 of results 500, disk design DD is replaced with disk design AA, and the baseline measurements shown are from a second set of baseline measurements, repeated for consistency or repeatability. Row 595 illustrates an eighth test in which disk DD is again inserted into drive 48A1, and the same measurements are taken as in test 4, results of which are shown in row 585. The results of test 8, as shown in row 595, may then be compared to the results in row 585 for repeatability.

Advantages of the magnetic media swap process include providing an ability to evaluate multiple disk designs with a single or, at most, a few drives in a short period of time and at greatly reduced costs, while minimizing head performance variables. That is, by utilizing the same read/write head, the present embodiment eliminates the noise associated with the head, since the read/write head noise typically is fairly constant from test to test. Thus, the noise cancels out in successive tests so that the electromagnetic characteristics of the magnetic media become readily discernable. Therefore, the present embodiment provides for a process of testing various designs of magnetic media without requiring a large number of assemblies to be built in order to provide an adequate statistical sampling since the various designs are tested in an assembly with known characteristics. Thus, the present embodiment, wherein the measurements are collected utilizing a known HDA, lends itself readily to being performed on-site at the manufacturer's research and development facility. This eliminates the long turn-around time and high costs associated with the conventional approach of large quantity drive assembly fabrication, frequently performed off-shore.

Thus, the present invention provides, in various embodiments, a disk pack swap process for evaluating magnetic recording performance. The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for testing electromagnetic characteristics of magnetic media while maintaining consistent performance of a read/write head and recording channel, such that reduced statistical sampling is achieved, said method comprising:

recording a first set of baseline measurements from a first magnetic media utilizing said read/write head and said recording channel;

removing said first magnetic media from an assembly comprising said read/write head and said recording channel and replacing said first magnetic media with a second magnetic media; and collecting measurements from said second magnetic media utilizing said read/write head and said recording channel, wherein said measurements from said second magnetic media are compared with said baseline measurements to determine noise associated with said read/write head and said recording channel which maintains consistent performance of said read/write head and said recording channel so as to reduce a size of statistical samples.

2. The method as recited in claim 1 further comprising:

removing said second magnetic media from said assembly and replacing it with a third magnetic media; and collecting measurements from said third magnetic media utilizing said read/write head and said recording channel, wherein said measurements are comparable with said baseline measurements and said measurements from said second magnetic media.

3. The method as recited in claim 2, further comprising:
recording a second set of baseline measurements from said first magnetic media and comparing with said first set of baseline measurements for repeatability.

4. The method as recited in claim 2, further comprising: repeating said measurements from said second magnetic media to check for repeatability.

5. The method as recited in claim 1 wherein said first magnetic media is a single magnetic disk.

6. The method as recited in claim 1 wherein said first magnetic media is a plurality of magnetic disks.

7. The method as recited in claim 1 wherein said measurements comprise soft error rate.

8. The method as recited in claim 1 wherein said measurements comprise overwrite.

9. The method as recited in claim 8, further comprising:
recording a second set of baseline measurements from said first magnetic media and comparing with said first set of baseline measurements for repeatability.

10. A method for performing tests on designs of magnetic media, wherein a read/write head and a recording channel remain constant, such that results are consistent with those expected when said magnetic media is assembled into a final product, said method comprising:
recording a first set of baseline measurements from a first magnetic media utilizing said read/write head and said recording channel;
removing said first magnetic media from an assembly comprising said read/write head and said recording channel and replacing it with a second magnetic media; and
collecting measurements from said second magnetic media utilizing said read/write head and said recording channel, wherein said measurements are compared with said baseline measurements to determine noise associated with the read/write head and said recording channel which maintains consistent performance of said read/write head and said recording channel with those expected when said magnetic media is assembled into a final product.

11. The method as recited in claim 10 further comprising:
removing said second magnetic media from said assembly and replacing it with a third magnetic media; and
collecting measurements from said third magnetic media utilizing said read/write head and said recording channel, wherein said measurements are comparable with said baseline measurements and said measurements from said second magnetic media.

12. The method as recited in claim 11, further comprising repeating said measurements from said second magnetic media to check for repeatability.

13. The method as recited in claim 11, further comprising:
recording a second set of baseline measurements from said first magnetic media and comparing with said first set of baseline measurements for repeatability.

14. The method as recited in claim 10 wherein said first magnetic media is a plurality of magnetic disks.

15. The method as recited in claim 10 wherein said measurements comprise soft error rate.

16. The method as recited in claim 10 wherein said measurements comprise overwrite.

17. The method as recited in claim 10 wherein said first magnetic media is a single magnetic disk.

18. A method of swapping magnetic media and maintaining consistency of read/write head and a recording channel performance when testing magnetic media designs, comprising:
recording a first set of baseline measurements from a first magnetic media utilizing said read/write head and said recording channel;
removing said first magnetic media from an assembly comprising said read/write head and said recording channel and replacing it with a second magnetic media; and
collecting measurements from said second magnetic media utilizing said read/write head and said recording channel, wherein said measurements are compared with said baseline measurements to determine noise associated with said read/write head and said recording channel which maintains consistent performance of said read/write head and said recording channel when testing a plurality of magnetic media designs.

19. The method as recited in claim 18 further comprising:
removing said second magnetic media from said assembly and replacing it with a third magnetic media; and
collecting measurements from said third magnetic media utilizing said read/write head and said recording channel, wherein said measurements are comparable with said baseline measurements and said measurements utilizing said second magnetic media.

20. The method as recited in claim 19, further comprising repeating said measurements from said second magnetic media to check for repeatability.

21. The method as recited in claim 18 wherein said first magnetic media is a single magnetic disk.

22. The method as recited in claim 18 wherein said first magnetic media is a plurality of magnetic disks.

* * * * *